United States Patent [19]

Carpenter

[11] 3,961,467
[45] June 8, 1976

[54] GRASS COLLECTING APPARATUS FOR ROTARY MOWER

[75] Inventor: Eugene C. Carpenter, Galesburg, Ill.

[73] Assignee: Outboard Marine Corporation, Waukegan, Ill.

[22] Filed: Dec. 18, 1974

[21] Appl. No.: 533,975

Related U.S. Application Data

[63] Continuation-in-part of Ser. No. 503,348, Sept. 5, 1974.

[52] U.S. Cl. .............................. 56/202; 56/320.2
[51] Int. Cl.² ........................................ A01D 35/22
[58] Field of Search ............ 56/202, 203, 198, 199, 56/320.2

[56] References Cited
UNITED STATES PATENTS

| | | | |
|---|---|---|---|
| 2,862,346 | 12/1958 | Anderson | 56/202 X |
| 3,002,332 | 10/1961 | Shane | 56/203 |
| 3,186,152 | 6/1965 | Epstein | 56/202 |
| 3,423,918 | 1/1969 | Siwek | 56/202 |
| 3,722,192 | 3/1973 | Corbett | 56/202 |

*Primary Examiner*—Louis G. Mancene
*Assistant Examiner*—J. N. Eskovitz
*Attorney, Agent, or Firm*—Michael, Best & Friedrich

[57] ABSTRACT

Disclosed herein is a rotary lawn mower including a grass collecting apparatus including a support, a frame adapted to releasably retain thereon a disposable grass collecting bag with the mouth thereof upwardly open, means pivotally mounting the frame on the support for movement between a bag retaining position wherein the frame is operative to removably retain thereon the grass collecting bag and a second position spaced from the bag retaining position so that movement of the frame from the bag retaining position to the second position is operable, when the bag is laden with clippings, to strip the bag from the frame, a chute having a discharge opening located adjacent to the upwardly open mouth of the bag for discharging grass clippings into the bag through the upwardly open mouth, a cover hinged to the support for movement between a closed position in covering relation to the open mouth of the bag and to the discharge opening and an open position affording access to the frame and to the discharge opening, a shutter selectively movable relative to the chute between a closed position blocking discharge from the chute and an open position permitting discharge from the chute, and latch means on the shutter and on the cover for retaining the cover in the closed position when the shutter is in the open position and for permitting movement of the cover from the closed position when the shutter is in the closed position.

12 Claims, 6 Drawing Figures

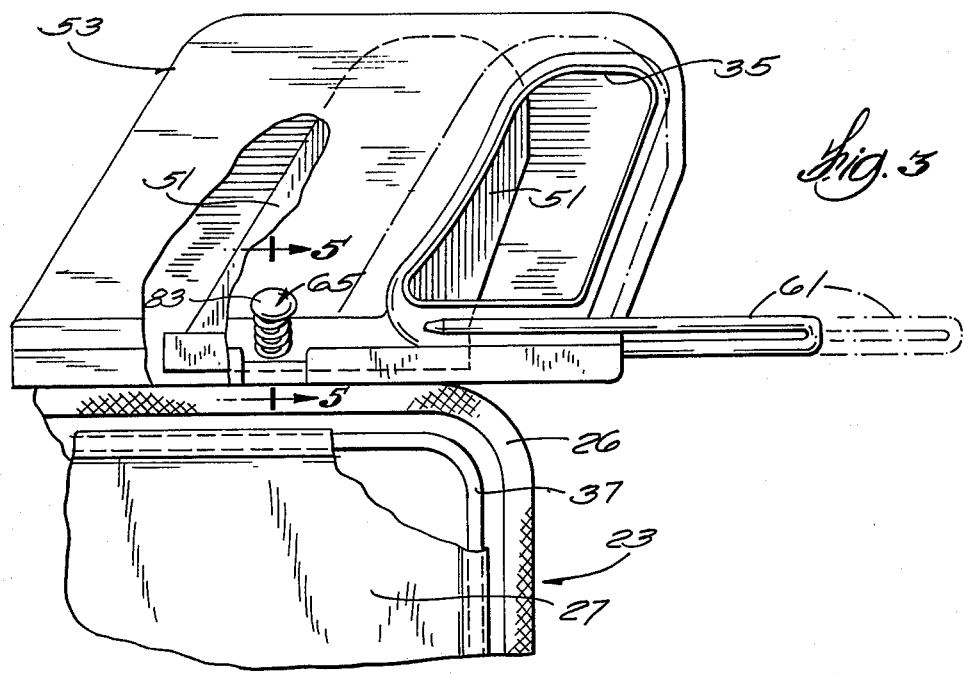
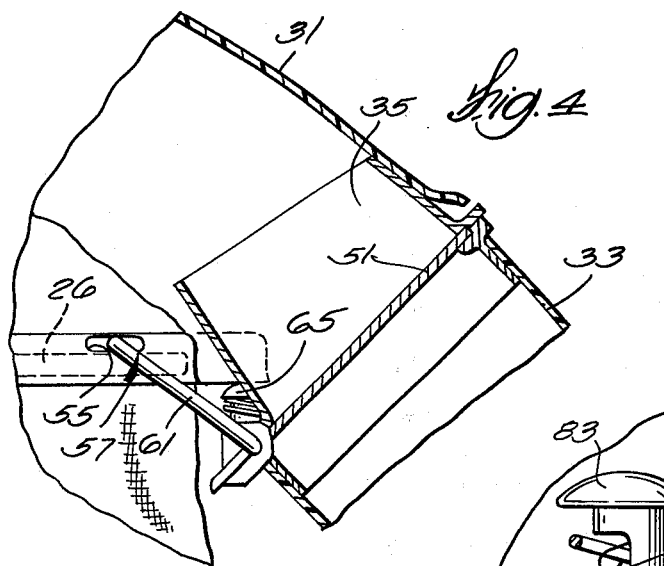
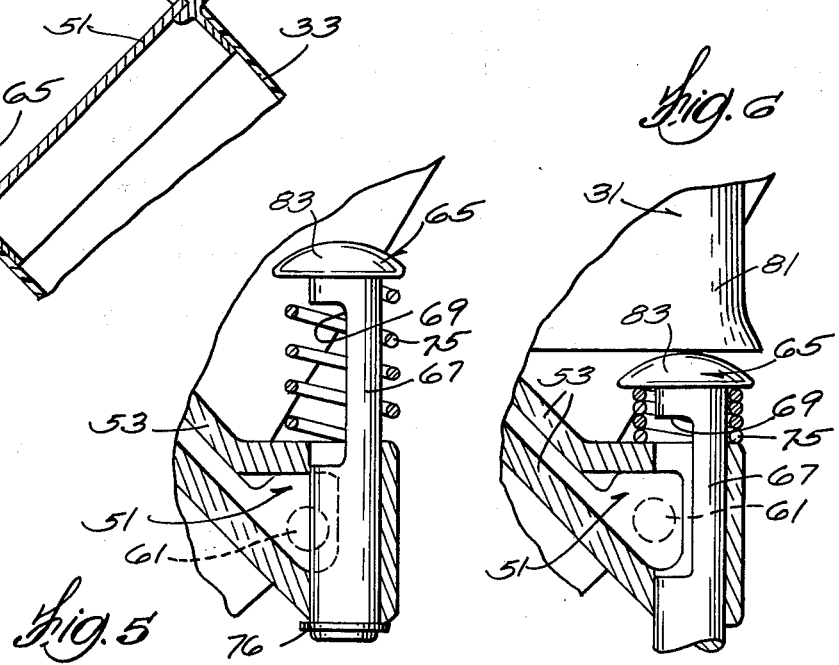

GRASS COLLECTING APPARATUS FOR ROTARY MOWER

RELATED APPLICATION

This application is a continuation in part application based on my earlier co-pending application Ser. No. 503,348, filed Sept. 5, 1974.

BACKGROUND OF THE INVENTION

The invention relates generally to rotary lawn mowers and to grass collecting apparatus for such lawn mowers.

More particularly, the invention relates to lawn mowers employing disposable bags for collecting grass clippings and other debris.

Reference is hereby made to the U.S. Dahl application Ser. Nos. 391,934, filed Aug. 27, 1973, and 405,831, filed Oct. 12, 1973.

SUMMARY OF THE INVENTION

The invention provides a lawn mower including a grass collecting apparatus comprising a receptacle having an open top, a chute having a discharge opening adjacent to the open top of the receptacle for discharging grass clippings into the receptacle, a cover removably located in covering relation to the open top of the receptacle, together with a shutter selectively movable relative to the chute between a closed position blocking discharge from the chute and an open position permitting discharge from the chute, and latch means on the shutter and on the cover for retaining the cover in covering relation to the receptacle open top when the chute is in the open position, and for permitting movement of the cover from covering relation to the receptacle open top when the shutter is in the closed position.

In accordance with a preferred embodiment of the invention, the cover is hinged to the grass collecting apparatus for movement between a closed position in covering relation to the open top and to the discharge opening and an open position affording access to the open top and to the discharge opening.

Also in accordance with a preferred embodiment of the invention, means are also provided for releasably preventing movement of the shutter relative to one of the closed position and the open position.

Preferably, the releasable means includes a member mounted for movement between a first position blocking movement of the shutter and a second position permitting movement of the shutter, together with means biasing the member toward the first position.

The invention also provides a lawn mower including a grass collecting apparatus comprising a support, a frame adapted to be engaged by a grass clipping collection bag, means mounting the frame from the support for movement between a bag engaging position wherein the frame is operative to movably retain thereon a grass collecting bag and a second position spaced from the bag engaging position so that movement of the frame from the bag engaging position to the second position is operable, when the bag is laden with clippings, to strip the bag from the frame. Preferably, the grass collecting bag is disposable.

In a preferred embodiment of the invention, one end of the frame is pivotally mounted to the support.

Still further in a preferred embodiment of the invention, a cover is mounted on the support for movement between a closed position in overlying relation to the frame and an open position clear of the frame. Preferably, the cover is pivotally connected to the support about an axis transverse to the axis of pivotal connection of the frame to the support.

While the shutter and latch means can be used independently of the movably mounted bag engaging frame and while the movably mounted bag engaging frame can be employed independently of the shutter and latch means, it is preferred that these structures be used in cooperation with one another.

One of the principal features of the invention is the provision of a lawn mower including a grass collecting discharge chute for delivering grass clippings to a grass collecting apparatus having an open-top receptacle which can be closed by a hood or cover, and further including a combined means for locating a shutter in discharge blocking relation to the chute and for preventing the removal of the hood from covering relation to the grass collecting receptacle when the shutter is not in the blocking position.

Another of the principal features of the invention is the provision of a rotary lawn mower as referred to in the preceding paragraph and further including releasable means for preventing movement of the shutter relative to the chute.

Another of the principal features of the invention is the provision of a grass clipping apparatus including a movably mounted frame arranged for removably receiving and holding the mouth of a grass clipping bag which, preferably, is disposable and for automatically stripping the bag from the frame in response to movement of the frame from a bag engaging position.

Still another of the principal features of the invention is the provision of a rotary lawn mower including a frame arranged for removably engaging and holding the mouth of a disposable grass collecting bag and for automatically stripping the bag from the frame in response to movement of the frame from a bag retaining position, together with a hood covering the movably mounted frame, and a shutter and latch mechanism as previously referred to.

Other features and advantages of the invention will become known by references to the following drawings, general description, and claims.

IN THE DRAWINGS

FIG. 3 is an enlarged, partially broken away and fragmentary view of a portion of the lawn mower shown in FIG. 1.

FIG. 4 is an enlarged view partially in section, of a portion of the lawn mower shown in FIG. 1.

FIG. 5 is an enlarged view, partially in section, taken along line 5—5 of FIG. 2, showing the components in one position.

FIG. 6 is a view similar to FIG. 5 illustrating the components in another position.

Figure 1:
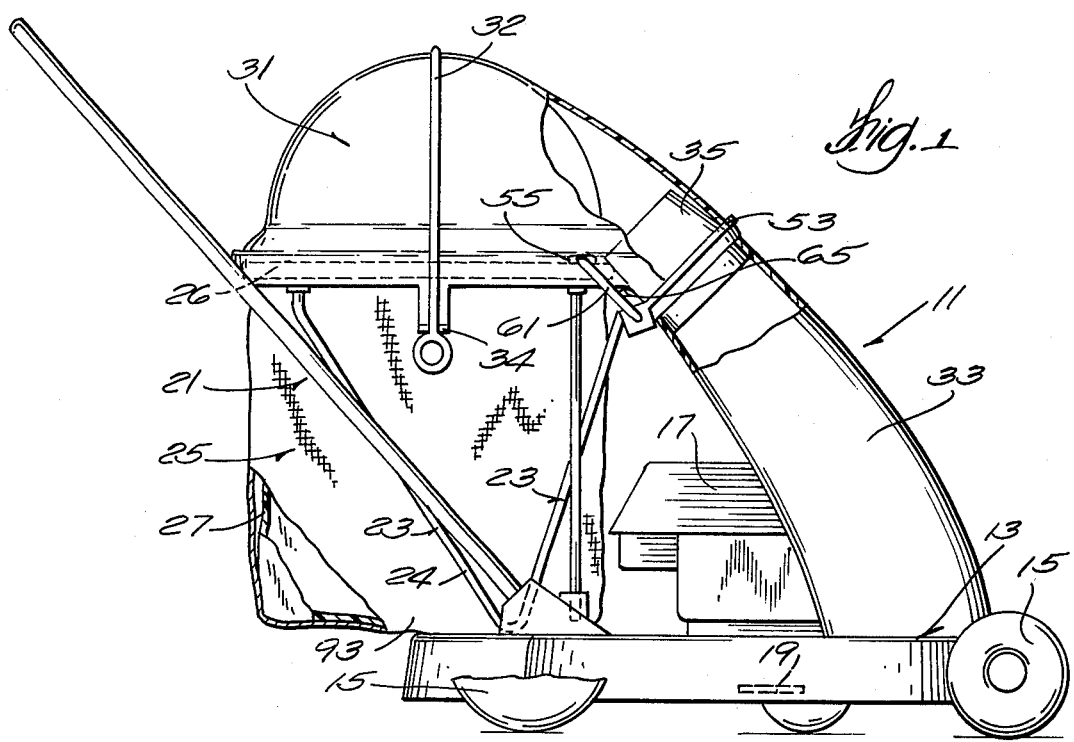
FIG. 1 is a partially broken away side elevational view of a lawn mower embodying various of the features of the invention.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

GENERAL DESCRIPTION

Shown in the drawings is a rotary lawn mower 11 including a blade housing 13 which is supported on the ground by a set of wheels 15, which supports an engine 17, and which houses a cutter blade 19 rotatably driven by the engine 17. Included in the lawn mower is a grass collecting apparatus 21 which is generally in accordance with the disclosure of my earlier application Ser. No. 503,348, filed Sept. 5, 1974, which is incorporated herein by reference. The grass collecting apparatus 21 can be supported from the mower housing 13 or otherwise, and, in the disclosed construction, includes a support 23 carried by the housing 13 as disclosed in U.S. application Ser. No. 503,348. In the illustrated construction, the support comprises a framework 24 which is mounted on the housing 13 and, on the top of the framework 24, a rectangular member 26. The support 23 also includes means mounting a receptacle 25 which includes an open top and which is preferably in the form of a disposable grass collection bag 27 arranged with an upwardly open mouth 28.

Figure 2:
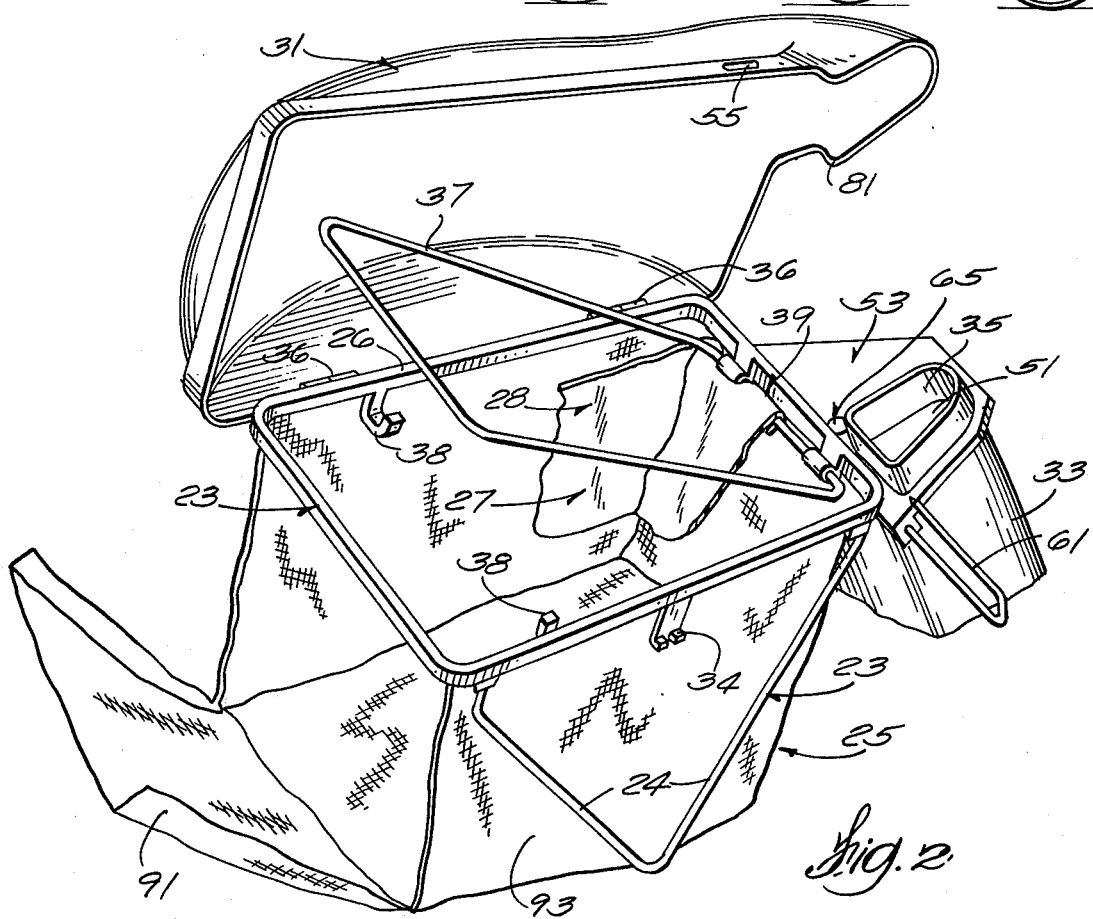
FIG. 2 is a partially schematic perspective view of the grass collecting apparatus and related components embodied in the lawn mower shown in FIG. 1.

In addition, the grass collecting apparatus includes a cover or hood 31 which is preferably movably mounted from the support 23 for movement between an open position clear of the open mouth of the receptacle 25 and a closed position covering the open mouth of the receptacle 25. In the illustrated construction, the cover 31 is connected to the rectangular member by hinges 36 shown schematically in FIG. 2. The cover 31 can be releasably retained on the rectangular member 26 by a retainer 32 in the form of an elastic member engagable with catches 34 formed on the member 26.

Extending from adjacent the open top of the grass collecting receptacle 25 is a chute 33 which communicates with the blade housing 13 for discharge of clippings from the housing 13 through the chute 33 and which includes a discharge opening 35 affording discharge of clippings from the chute 33 into the open mouth of the receptacle 25. When the cover 31 is in the closed position, the chute discharge opening 35 is covered and, when the cover 31 is in the open position or is removed from the top of the receptacle 25, the chute discharge opening 31 is accessible.

In accordance with one aspect of the invention, the grass collecting apparatus 21 includes a disposable bag retaining frame 37, together with means mounting the frame from the support 23 for movement between a normal operating position in which the bag 27 is releasably retainable of the frame 37 and a second position spaced from the bag retaining position such that movement of the frame 37 from the bag retaining position serves, (assuming that the cover 31 is removed from the grass collecting apparatus, i.e., is in the open position, and that the bag 27 is laden with clippings) to automatically strip the bag 27 from the frame 27 to facilitate disposal of the bag 27 from the grass collecting apparatus. In the preferred construction, the frame 37 is preferably generally rectangular, is pivotally mounted, by suitable means, adjacent its forward edge 39, to the support 23, and, in particular, to the rectangular member 26. When in the bag retaining position the frame 37 is also supported by one or more hooks or ledges 38 extending from the rectangular member 26. In addition, it is preferred that the hood 31 be pivotally mounted, by suitable means, on the support 23, and preferably from the rectangular member 26, about an axis transverse to the pivotal axis of the frame 37.

In accordance with another related aspect of the invention, the chute is provided with a shutter 51 which is mounted in a housing 53 (See FIG. 3) carried by the chute 33 or the support 23 and which is suitably guided by housing 53 for movement transversely of the chute 31 between a first position blocking or closing the chute discharge opening 35 and thereby preventing discharge of clippings from the chute 33, and a second or open position permitting unhindered discharge of clippings through the discharge opening 35 from the chute 33.

In further accordance with the invention, latch means are provided on the cover 31 and on the housing 53 for preventing movement of the cover 31 from the closed position when the shutter 51 is in the open position and for permitting movement of the cover 31 from the closed position when the shutter 51 is in the closed position, which movement of the cover 31 from the closed position can include either removal of the cover 31 from the grass collecting apparatus for movement to an open position without physical separation of the cover 31 from the support 23. Alternatively, the cover or hood 31 could be movably mounted on the chute 33.

While various arrangements can be employed, in the illustrated construction, the latch means comprises (See FIG. 4) a notch or opening 55 located in a side of the cover 31 and including a locking surface 57, together with a U-shaped bail member 61 which is preferably fixed to the shutter 51 for common movement therewith and which, when the shutter 51 is in the open position, extends into the notch 55 above the surface 57 to prevent movement of the cover from the closed position, i.e., in the illustrated construction, upward movement about the pivotal connection to the support 23. The bail member 61 is withdrawn from the notch 55 incident to movement of the shutter 51 to the closed position, thereby permitting movement of the cover 31 from the closed position when the shutter is in the closed position.

In further accordance with the invention, means are provided for releasably preventing movement of the shutter 51 and, preferably, for preventing movement relative to the closed position. Thus, in order to effect movement of the shutter 51 form the closed position, the operator must take positive action. In addition, it is noted that movement of the shutter 51 to open position will not fully occur if the cover 31 is improperly located in the closed position by reason of interference with insertion of the bail member 61 into the notch 55.

While other constructions could be employed, in the illustrated construction, the releasable means includes a button 65 movable in the housing 53 and having a shank 67 with a cut out or notch 69. The button 65 is axially movable relative to the shutter housing 53 between a first position wherein the shank 67 prevents shutter movement relative to the closed position, and a second position wherein the shutter 51 is free to move through the notch 69 to and from the closed position.

The button 65 is biased outwardly relative to the shutter housing 53 and toward the first position by suitable spring means 75. Accordingly, in order to shift the shutter 51 from the closed position, the button 65 must be depressed inwardly of the housing 53 against the action of the spring means 75 by either the operator or by engagement by a portion 81 of the cover 31 extending in engagement with the button head 83 when the cover 31 is in the closed position. Disassembly of the button 65 from the housing 53 by the spring means 75 is prevented by a retainer ring 76.

In operation, when the cover 31 is in the covering or closed position, in order to replace a grass laden bag or otherwise to empty the grass clipping receptacle 25, the button 65 is held depressed by engagement of the cover portion 81 and the bail member 61 is shifted so as to move the shutter 51 into blocking relation to the chute discharge opening 35 and to withdraw the bail member 61 from the notch 55, thereby permitting movement of the cover 31 from the closed position so as to afford access to the underlying frame. It is to be noted that closure of the chute discharge opening 35 by the shutter 51 blocks discharge therefrom even if the mower engine 17 is still running. With the cover 31 moved from the closed position, the frame 37 can be pivoted upwardly from its normal position to strip the disposable grass collecting bag 27 from the frame 37 to facilitate removal thereof in any suitable manner from the grass collecting apparatus, as for instance, through a rearwardly located trap door or access panel 91 in a supporting sling 93 or other container extending from the support 23 and housing the disposable bag 27, as disclosed generally in my earlier application Ser. No. 503,348.

It is especially noted that the combined shutter and cover latch mechanism provides safety advantages independently of whether the grass collecting receptacle is a disposable bag or is otherwise constructed and independently of the arrangement for locating the receptacle in position to receive clippings and for emptying the receptacle from the grass collecting apparatus. However, it is preferred that the combined shutter and cover latch mechanism be employed in unison with the frame 37 which is operative to removably retain open the mouth of a disposable grass collecting bag and which is operative, in response to movement from a normal operating position, to automatically effect stripping of a grass laden bag 27 from the frame 37.

Various of the features of the invention are set forth in the following claims.

What is claimed is:

1. A lawn mower including a grass collecting apparatus including a receptacle having an open top, a chute having a discharge opening adjacent to said open top, a cover removably located in covering discharging grass clippings into said receptacle through said open top, a cover removably located in covering relation to said open top, a shutter selectively movable relative to said chute between a closed position blocking discharge from said chute and an open position permitting discharge from said chute, and latch means on said shutter and on said cover for retaining said cover in covering relation to said receptacle when said shutter is in said open position and for permitting movement of said cover from covering relation to said receptacle open top when said shutter is in said closed position.

2. A lawn mower in accordance with claim 1 wherein said cover is hinged to said grass collecting apparatus for movement between a closed position in covering relation to said open top and to said discharge opening and an open position affording access to said open top and to said discharge opening.

3. A lawn mower in accordance with claim 1 and further including means for releasably preventing movement of said shutter relative to one of said closed position and said open position.

4. A lawn mower in accordance with claim 3 wherein said releasable means includes a member mounted for movement between a first position blocking movement of said shutter and a second position permitting movement of said shutter, and means biasing said member toward said first position.

5. A lawn mower comprising a grass collecting apparatus including a grass collecting bag, a support, a frame removably engageable with said bag for retention thereof in a grass collecting position, and means mounting said frame from said support for movement between a bag retaining position and a second position spaced from said bag retaining position so that movement of said frame from said bag retaining position to said second position is operable, when said bag is laden with clippings, to remove said bag from said frame.

6. A lawn mower in accordance with claim 5 wherein said frame is pivotally mounted on said support.

7. A lawn mower in accordance with claim 5 and further including a cover mounted on said support for movement between a closed position in overlying relation to said frame and an open position clear of said frame.

8. A lawn mower in accordance with claim 7 wherein said cover is pivotally connected to said support about an axis transverse of the axis of pivotal connection of said frame on said support.

9. A lawn mower including a grass collecting apparatus including a support, a frame adapted to releasably retain thereon a disposable grass collecting bag with the mouth thereof upwardly open, means pivotally mounting said frame on said support for movement between a bag retaining position wherein said frame is operative to removably retain thereon the grass collecting bag and a second position spaced from said bag retaining position so that movement of said frame from said bag retaining position to said second position is operable, when the bag is laden with clippings, to strip the bag from said frame, a chute having a discharge opening located adjacent to the upwardly open mouth of the bag for discharging grass clippings into the bag through the upwardly open mouth, a cover hinged to said support for movement between a closed position in covering relation to the open mouth of the bag and to said discharge opening and an open position affording access to said frame and to said discharge opening, a shutter selectively movable relative to said chute between a closed position blocking discharge from said chute and an open position permitting discharge from said chute, and latch means on said shutter and on said cover for retaining said cover in said closed position when said shutter is in said open position and for permitting movement of said cover from said closed position when said shutter is in said closed position.

10. A lawn mower including a grass collecting apparatus including a receptacle having an open top, a chute extending upwardly toward said open top and having a discharge opening adjacent to said open top for discharging grass clippings into said receptacle through said open top, and a shutter located adjacent to said discharge opening and selectively movable relative to said chute between a closed position blocking discharge from said discharge opening and an open position permitting discharge from said discharge opening.

11. A lawn mower in accordance with claim 10 and further including means for releasably preventing movement of said shutter relative to one of said closed position and said open position.

12. A lawn mower including a grass collecting apparatus including a removable receptacle having an entry opening, a chute having a discharge opening adjacent to said entry opening for discharging grass clippings into said receptacle through said entry opening, a cover removably located in covering relation to said receptacle, a shutter selectively movable relative to said chute between a closed position blocking discharge from said chute and an open position permitting discharge from said chute, and latch means on said shutter and on said cover for retaining said cover in covering relation to said receptacle when said shutter is in said open position and for permitting movement of said cover from covering relation to said receptacle when said shutter is in said closed position.

* * * * *

CERTIFICATE OF CORRECTION

Patent No. 3,961,467　　　　　Dated June 8, 1976

Inventor(s) Eugene C. Carpenter

It is certified that error appears in the above-identified patent and that said Letters Patent are hereby corrected as shown below:

| | |
|---|---|
| Column 5, line 51 | delete "top" |
| Column 5, line 51 | delete "a cover removably located in covering", insert ---for---. |
| Column 6, line 29 | insert after "wherein" ---said frame is pivotally connected to said support and---. |

Signed and Sealed this

First Day of March 1977

[SEAL]

Attest:

RUTH C. MASON
Attesting Officer

C. MARSHALL DANN
Commissioner of Patents and Trademarks